(12) United States Patent
Endo et al.

(10) Patent No.: US 11,311,822 B2
(45) Date of Patent: Apr. 26, 2022

(54) BUBBLE SEPARATOR, AND FLUID CIRCUIT FOR AUTOMOBILE THAT INCLUDES BUBBLE SEPARATOR

(71) Applicants: Mahle International GmbH, Stuttgart (DE); Mahle Filter Systems Japan Corporation, Tokyo (JP)

(72) Inventors: Yoshikazu Endo, Tokyo (JP); Tsuyoshi Hagiwara, Tokyo (JP); Hirotaka Kobayashi, Tokyo (JP)

(73) Assignees: Mahle International GmbH; Mahle Filter Systems Japan Corporation

( * ) Notice: Subject to any disclaimer, the term of this patent is extended or adjusted under 35 U.S.C. 154(b) by 0 days.

(21) Appl. No.: 17/134,162

(22) Filed: Dec. 24, 2020

(65) Prior Publication Data

US 2021/0220757 A1 Jul. 22, 2021

(30) Foreign Application Priority Data

Dec. 25, 2019 (JP) .............................. JP2019-235226

(51) Int. Cl.
*B01D 19/00* (2006.01)
*B04C 3/06* (2006.01)
(Continued)

(52) U.S. Cl.
CPC ............ *B01D 19/0057* (2013.01); *B04C 3/06* (2013.01); *F01M 1/02* (2013.01); *F01M 1/10* (2013.01);
(Continued)

(58) Field of Classification Search
CPC ........ B01D 19/0057; B04C 3/06; F01M 1/10; F01M 1/02; F01M 2001/105;
(Continued)

(56) References Cited

U.S. PATENT DOCUMENTS

2003/0106292 A1* 6/2003 Kitano .................. B01D 45/12
55/396
2006/0196221 A1* 9/2006 Westermeyer .......... F25B 43/02
62/470
(Continued)

FOREIGN PATENT DOCUMENTS

DE 102012211805 B4 5/2016
JP H09-226394 A 9/1997

OTHER PUBLICATIONS

English abstract for JP-H09-226394.
(Continued)

*Primary Examiner* — Yi-Kai Wang
(74) *Attorney, Agent, or Firm* — Fishman Stewart PLLC

(57) ABSTRACT

A bubble separator used in a fluid circuit for an automobile and that separates bubbles in a refrigerant may include a swirl flow formation part extending in a substantially horizontal direction, and including an internal space having a columnar shape. The bubble separator may also include a flow inlet disposed at one end of the swirl flow formation part, and being open so as to cause the refrigerant to flow in the flow inlet in a tangential direction of an inner peripheral surface of the swirl flow formation part and so as to form a swirl flow on the inner peripheral surface. The bubble separator may also include a flow outlet disposed at another end of the swirl flow formation part, and being open so as to cause the refrigerant to flow out of the flow outlet in a tangential direction from the inner peripheral surface. The bubble separator may further include a gas discharge port to discharge gas separated from the refrigerant in the swirl flow formation part outside of the swirl flow formation part, and at least one liquid drop nozzle provided on a wall surface of the swirl flow formation part.

20 Claims, 5 Drawing Sheets

(51) Int. Cl.
  *F01M 1/10* (2006.01)
  *F25B 43/04* (2006.01)
  *F01M 1/02* (2006.01)

(52) U.S. Cl.
  CPC ..... *F25B 43/043* (2013.01); *F01M 2001/105* (2013.01); *F01M 2001/1035* (2013.01)

(58) Field of Classification Search
  CPC .......... F01M 2001/1035; F25B 43/043; F25B 2400/02; F25B 43/00; F25B 2400/23
  USPC ......................................................... 96/216
  See application file for complete search history.

(56) References Cited

U.S. PATENT DOCUMENTS

| | | | | |
|---|---|---|---|---|
| 2008/0098893 | A1* | 5/2008 | Ringenberger | B01D 19/0042 95/261 |
| 2014/0275690 | A1* | 9/2014 | Hernandez | B01D 17/0217 585/800 |
| 2018/0128219 | A1* | 5/2018 | Kapp | F02M 37/04 |
| 2018/0258806 | A1* | 9/2018 | Butterworth | F01M 11/02 |
| 2018/0361290 | A1* | 12/2018 | Suzuki | F02M 35/10 |

OTHER PUBLICATIONS

German Search Report dated Sep. 24, 2021 for copending German Patent Application No. DE 102020216174.7.
Wikipedia, Die freie Enzyklopadie. Bearbeitungsstand Jul. 19, 2019, 9:20; Artikel Zylinder (Geometrie) [abgerufen am Sep. 24, 2019].

\* cited by examiner

BUBBLE SEPARATOR, AND FLUID CIRCUIT FOR AUTOMOBILE THAT INCLUDES BUBBLE SEPARATOR

CROSS-REFERENCE TO RELATED APPLICATIONS

This application claims priority to Japanese Patent Application No. JP 2019-235226, filed on Dec. 25, 2019, the contents of which are hereby incorporated by reference in their entirety.

TECHNICAL FIELD

The present invention relates to a bubble separator that separates bubbles contained in liquid by a centrifugal force, and a fluid circuit for an automobile including the bubble separator.

BACKGROUND

Conventionally, a motor cooling system that includes a fluid circuit for cooling a motor shaft, a coil end and the like, using lubricating oil at a variable speed gear or a differential gear, or ATF in a transmission, is adopted in a motor whose output power density is relatively high, as exemplified by a motor for driving adopted in an electric automobile or an electric train (for example, see Japanese Patent No. 09-226394).

In the motor cooling system that includes the fluid circuit as described above, many bubbles are generated in oil owing to oil stirred up by gears or injection of oil to a motor shaft or a coil end. As the amount of bubbles in oil increases, the actual flow rate of oil pressure-fed by a pump to a motor to be cooled decreases. Therefore, a problem occurs in that the cooling efficiency of the motor decreases. Furthermore, noise due to crushing bubbles occurs and when ATF is used as cooling oil, a problem also occurs in that the speed change efficiency decreases according to degradation in hydraulic responsiveness in the transmission.

The present invention has been made in view of the problems described above, and has an object to provide a bubble separator that efficiently removes bubbles contained in liquid, and a fluid circuit for an automobile with a cooling efficiency being improved by use of such a bubble separator.

SUMMARY

To solve the problems described above, according to an embodiment of the present invention, a bubble separator used in a fluid circuit for an automobile and separating bubbles in liquid is provided, the bubble separator comprising: a swirl flow formation part extending in a nearly horizontal direction, and including an internal space having a columnar shape; a flow inlet disposed at one end of the swirl flow formation part, and being open so as to cause the liquid to flow in the flow inlet in a tangential direction of an inner peripheral surface of the swirl flow formation part and so as to form a swirl flow on the inner peripheral surface; an flow outlet disposed at another end of the swirl flow formation part, and being open so as to cause the liquid to flow out of the flow outlet in a tangential direction from the inner peripheral surface; a gas discharge port to discharge gas separated from the liquid in the swirl flow formation part, outside of the swirl flow formation part; and a single or a plurality of liquid drop nozzles provided on a wall surface of the swirl flow formation part.

According to this, while the liquid swirls in the swirl flow formation part, the bubbles contained in the liquid are separated by a centrifugal force, and the separated gas is discharged from the gas discharge port provided at the swirl flow formation part. Therefore, deaeration from the liquid can be performed with a high efficiency. Further, by dropping the deaerated liquid from the drop nozzle, it is possible to efficiently cool a cooling object.

The bubble separator may further comprise a gas column promotion part in an interior of the swirl flow formation part, the gas column promotion part extending coaxially with the swirl flow formation part and having a tubular shape. According to this, in the swirl flow formation part, formation of a gas column made of gas separated from the liquid is promoted. Therefore, mixing of the gas once separated from the liquid into the liquid again decreases. Consequently, the deaeration efficiency can be further improved.

It is preferable that a distance between a distal end of the gas column promotion part and a central axis of the liquid drop nozzle closest to the distal end be equal to or more than one time an inner diameter of the flow inlet. Thereby, it is possible to drop sufficiently deaerated liquid from the drop nozzle.

When an inner diameter of the flow inlet is d, an inner diameter D of the swirl flow formation part may be 1.5 d to 3 d. Accordingly, a space where the gas column made of the gas separated from the liquid exists is sufficiently secured in the swirl flow formation part, thereby high deaeration efficiency can be achieved.

The gas discharge port may be provided at each of both ends of the swirl flow formation part. According to this, it is possible to efficiently discharge the separated gas from the swirl flow formation part.

According to another embodiment of the present invention, a viscous fluid circuit for an automobile is provided, the viscous fluid circuit comprising: an oil pan; a pump that feeds oil from the oil pan; a bubble separator that separates bubbles from the oil fed from the pump; and a motor, in which the bubble separator is disposed so as to extend in a nearly horizontal direction, is configured to generate a swirl flow in an interior thereof by a discharge pressure of the pump, and is configured to drop liquid from which the bubbles have been separated by the bubble separator, from a single or a plurality of liquid drop nozzles provided on the bubble separator, toward the motor.

According to this, the bubbles contained in the liquid are efficiently removed by the bubble separator. Therefore, it is possible to efficiently cool the motor by the liquid that is dropped from the drop nozzle. Further, when the viscous fluid circuit is embedded, for example, in a transmission, it is possible to expect reduction in noise caused by bubbles, and improvement in hydraulic responsiveness.

The oil may be a lubricating oil for the automobile or an automatic transmission fluid, or may be a refrigerant of a cooling system or a cooler.

According to the present invention, while the liquid swirls in the swirl flow formation part, the gas contained in the liquid is separated by the centrifugal force, and the deaerated liquid is dropped from the drop nozzle. Thereby, it is possible to efficiently cool the cooling object.

DETAILED DESCRIPTION

Hereinafter, an embodiment for implementing the present invention will be described with reference to the drawings.

Figure 1:
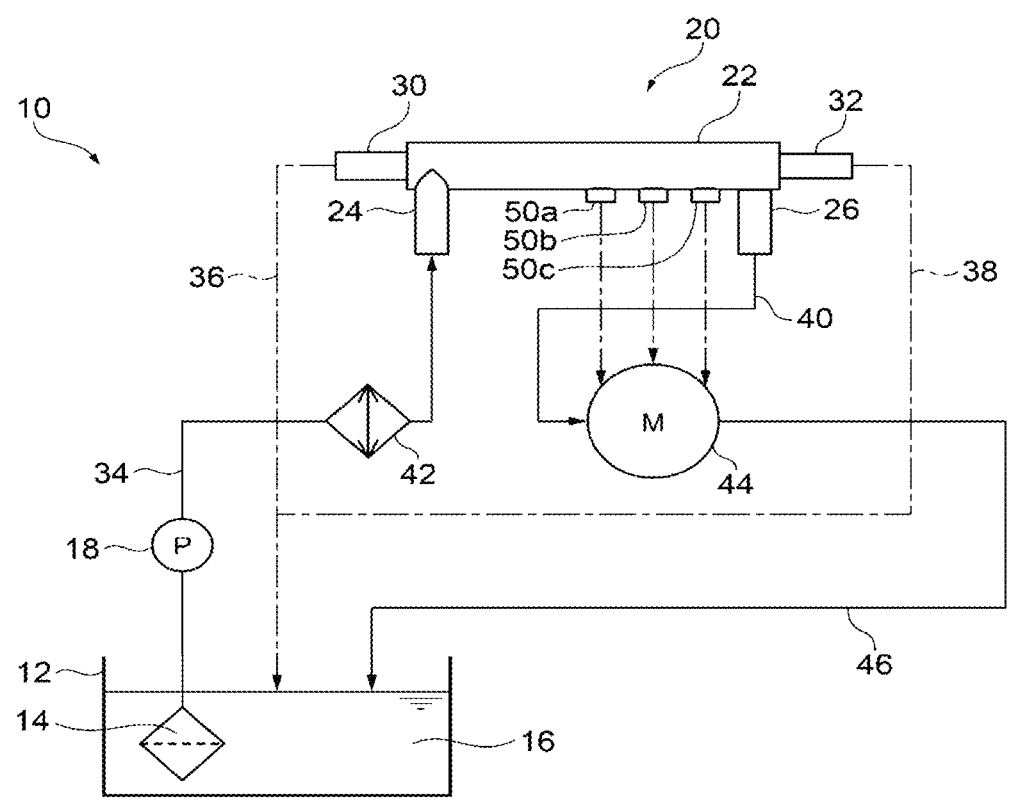
FIG. 1 is a schematic diagram of a motor cooling system.

FIG. 1 is a schematic circuit diagram of a motor cooling system 10 that includes a fluid circuit provided with a bubble separator according to an embodiment of the present invention. This motor cooling system 10 is assumed to be embedded in a casing of a planetary gear type transmission that incorporates a motor, for example. Solid lines 34, 40 and 46 in the diagram indicate the flows of oil that is, for example, ATF (automatic transmission fluid). However, the flows are schematic ones and are not limited to those flowing through a pipe or the like.

For example, in a planetary gear type transmission, a gear that rotates, as exemplified by a ring gear, scrapes oil, so that a considerable amount of bubbles are mixed into the oil. Bubbles are mixed into the oil also by injecting oil to the motor for the sake of cooling. The bubble separator according to the present embodiment is provided for efficiently separating bubbles from the oil.

In FIG. 1, an oil pan 12 is disposed at a bottom portion of an unillustrated casing, and collects and accumulates oil 16. A pump 18 pumps up the oil 16 in the oil pan 12 through an oil strainer 14, and pressure-feeds the oil 16 to the bubble separator 20 through a path 34. On the path 34, a heat exchanger 42 is disposed, and cools the oil. The bubble separator 20 separates the oil and gas from each other, and discharges the oil through a path 40 while discharging the separated gas through paths 36, 38. The bubble separator 20 will be described in detail with FIG. 2.

The oil discharged from the bubble separator 20 is subsequently injected to a cooling object element of a motor 44, for example, a motor shaft, or is dropped to a coil, and cools this. The injected or dropped oil is collected into the oil pan 12 through a path 46.

Figure 2:
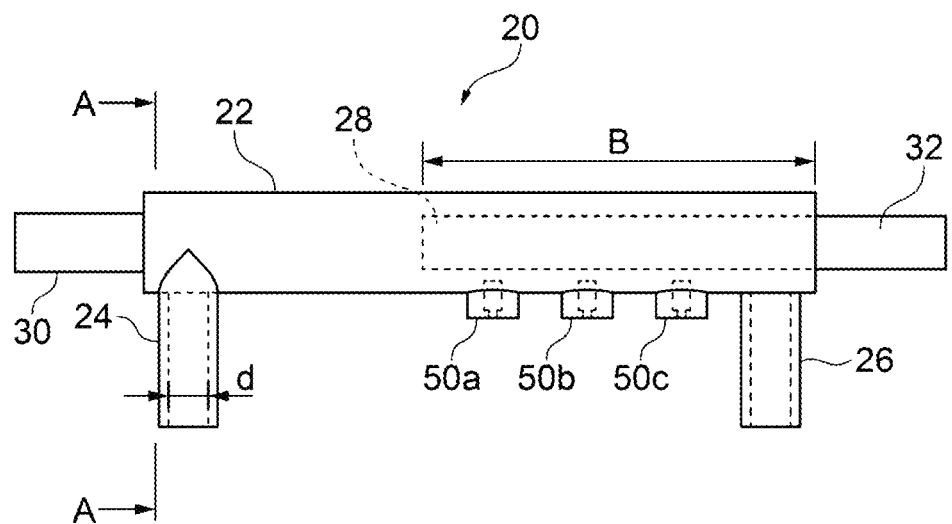
FIG. 2 is a lateral view of a bubble separator.
Figure 3:
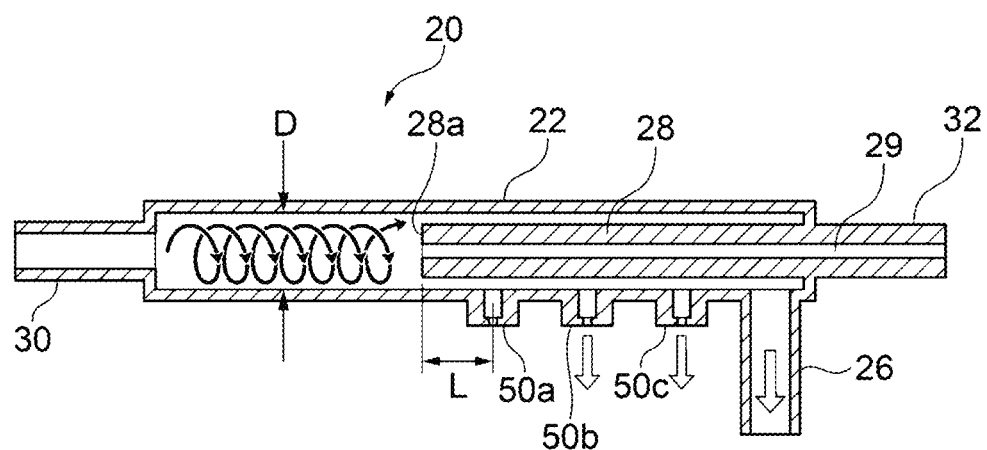
FIG. 3 is a sectional view of the bubble separator.

FIG. 2 is a lateral view of the bubble separator 20, and FIG. 3 is a sectional view for which the bubble separator 20 is taken along a plane passing through a central axis of the bubble separator 20. The bubble separator 20 comprises a swirl flow formation part 22 extending in the horizontal direction and having a cylindrical shape. A flow inlet 24 extending in the vertical direction and having a tubular shape is provided at one end of the swirl flow formation part 22. The flow inlet 24 has a role of receiving the oil pressure-fed from the pump 18 and delivering the oil into the swirl flow formation part 22. The flow inlet 24 is open on an inner peripheral surface of the swirl flow formation part 22, at a position that allows the oil to flow in the flow inlet 24 in a tangential direction of the inner peripheral surface, that is, at a position that is offset with respect to a central axis of the swirl flow formation part 22.

The oil flowing from the flow inlet 24 forms a swirl flow on the inner peripheral surface of the swirl flow formation part 22 owing to the velocity energy. The swirl flow has a centrifugal force of 10G or higher, for example, and flows to another end of the swirl flow formation part 22 while spirally swirling as shown in FIG. 3. During the swirling, the oil moves to an outer periphery side and bubbles move to an inner periphery side owing to the difference of centrifugal forces which the oil and bubbles receive. Therefore, the oil and the bubbles are separated from each other.

A flow outlet 26 extending in the vertical direction and having a tubular shape is provided at the other end of the swirl flow formation part 22. The flow outlet 26 is open on the inner peripheral surface, at a position that allows the oil having spirally flown in the swirl flow formation part 22 to flow out of the flow outlet 26 in a tangential direction of the inner peripheral surface, that is, at a position that is offset with respect to the central axis of the swirl flow formation part 22.

Figure 4:
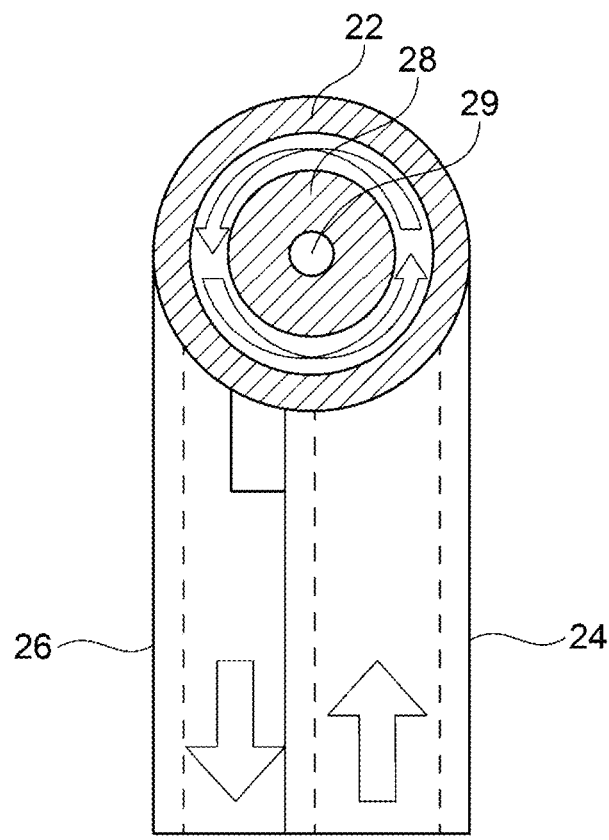
FIG. 4 is an A-A line sectional view of the bubble separator in FIG. 2, and is a diagram illustrating the flow of liquid in the bubble separator.

FIG. 4 is a sectional view taken along line A-A in FIG. 2. As shown in FIG. 4, the oil is caused to flow in the tangential direction of the inner peripheral surface of the swirl flow formation part 22 through the flow inlet 24, and the oil is caused to flow in the tangential direction of the inner peripheral surface of the swirl flow formation part 22 through the flow outlet 26, thereby minimizing the loss of the kinetic energy of the oil pressure-fed by the pump 18.

Gas separated from the oil accumulates around the central axis of the swirl flow formation part 22. At both ends of the swirl flow formation part 22, gas discharge ports 30, 32 are respectively provided. The gas separated in the swirl flow formation part is discharged from the gas discharge ports 30, 32, by the pressure difference between the interior and exterior of the swirl flow formation part 22.

At this time, the separated gas accumulates at the center of the swirl flow formation part 22 and forms a gas column. However, if a right end of the formed gas column communicates not with the gas discharge port 32 but with the flow inlet 26 that is open on a wall surface of the swirl flow formation part 22, the gas is mixed with the oil again around the flow outlet 26.

Hence, a gas column promotion part 28 extending coaxially with the swirl flow formation part 22 and having a tubular shape is provided in the interior of the swirl flow formation part 22. The gas column promotion part 28 may be provided integrally with the gas discharge port 32, and in this case, a passage 29 in the gas column promotion part 28 extends so as to pass through the gas discharge port 32. In a zone shown by B in FIG. 2, a space having an annular shape is formed between the swirl flow formation part 22 and the gas column promotion part 28, and in this space, the swirl flow swirls along an inner wall.

By providing such a gas column promotion part 28, an end of the gas column formed in the swirl flow formation part 22 is introduced to a distal end 28a of the gas column promotion part 28, and therefore, it is possible to prevent the end of the gas column from communicating with the flow outlet 26. Accordingly, around the flow outlet 26, mixing of gas into the oil again is suppressed, which can resultantly improve the separation efficiency for bubbles.

The oil from which the bubbles have been separated is discharged from the flow outlet 26, and is used for the cooling of the motor. In addition to this, drop nozzles 50a, 50b, 50c oriented downward are provided on a wall surface of the swirl flow formation part 22. The deaerated oil is dropped from the drop nozzles 50a, 50b, 50c to a cooling object of the motor 44, for example, to a coil end. The drop nozzles 50a, 50b, 50c are provided in a portion that overlaps with the gas column promotion part 28, that is, in the zone shown by B in FIG. 2. The number of drop nozzles and the inner diameter can be appropriately selected depending on the size of the cooling object.

It is preferable that a distance L between the distal end 28*a* of the gas column promotion part 28 and a central axis of the liquid drop nozzle 50*a* closest to the distal end 28*a* be equal to or more than one time an inner diameter d of the flow inlet. While the swirl flow passes by this distance L, the bubbles are sufficiently separated from the oil, and therefore, the oil from the drop nozzle has a high cooling efficiency.

In FIGS. 1 to 3, the bubble separator 20 is disposed so as to extend in the horizontal direction. However, the bubble separator 20 may be disposed so as to be inclined with respect to the horizontal plane, as long as it is possible to drop the oil from the liquid drop nozzles 50*a* to 50*c* by the gravitational force. Further, the orientation of the liquid drop nozzles 50*a* to 50*c* does not need to be the vertical downward orientation, and may have an angle with respect to a vertical line. Thereby, it is possible to drop the oil to a wider area on the cooling object. Similarly, the orientation of the flow inlet 24 and flow outlet 26 does not need to be the vertical downward orientation.

Figure 5:
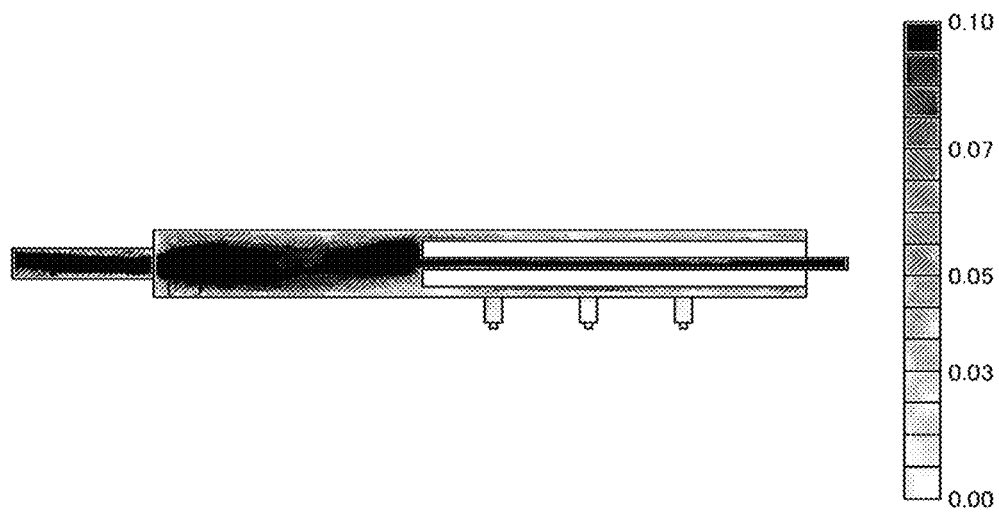
FIG. 5 is a contour diagram showing a state of separation between liquid and gas in the bubble separator.

FIG. 5 is a gas-liquid contour diagram resulting from evaluating the degree of separation of bubbles in the gas column promotion part when the oil temperature is 80° C., by CAE (Computer Aided Engineering). A bar on a right side in FIG. 5 shows the air content percentage in the liquid, by the density of color, and for example, a numerical value of 0.10 shows that the air content percentage is 10%.

It is found that a clear gas column is formed at the center of the swirl flow formation part due to the existence of the gas column promotion part and the separated air is discharged through the gas discharge port. Further, it is found that in the drop nozzles, the air content percentage is 10% or less, that is, 90% or more of the bubbles have been separated. Therefore, the oil to be dropped from the drop nozzles has a high cooling effect.

Figure 6:
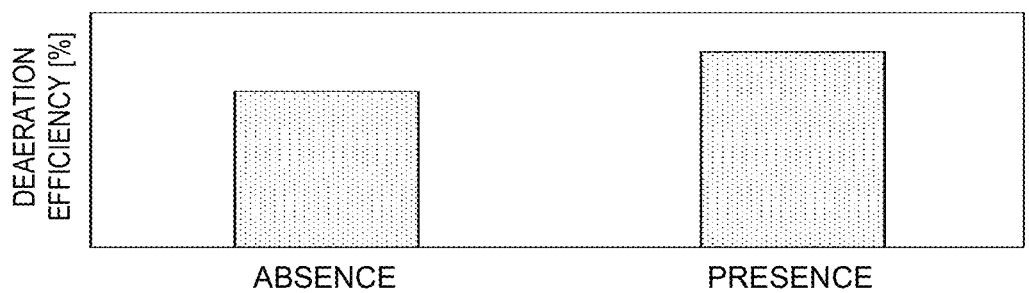
FIG. 6 is a graph showing a difference in deaeration efficiency according to presence or absence of a gas column promotion part.

FIG. 6 is a graph resulting from evaluating, by CAE, the deaeration efficiency according to presence or absence of the gas column promotion part, that is, the ratio of air that can be separated from liquid containing bubbles. According to this, it is found that the deaeration efficiency increases by about 20% by providing the gas column promotion part.

Figure 7:
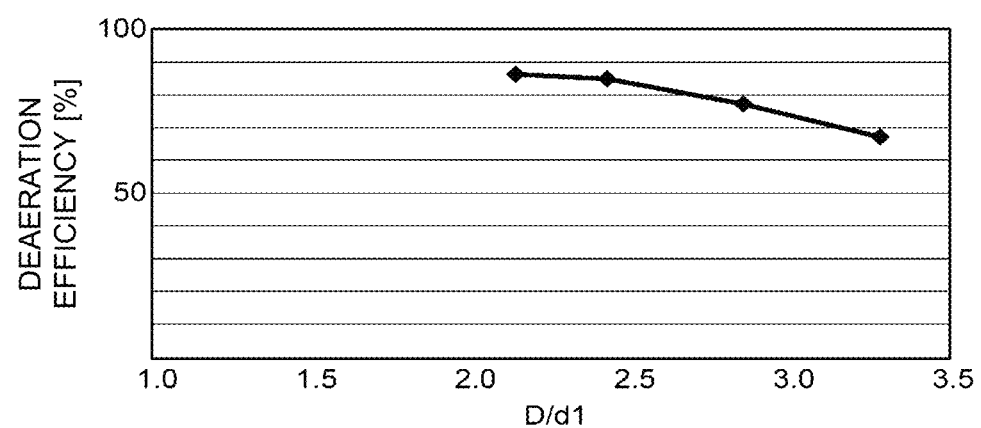
FIG. 7 is a graph showing the relationship between the inner diameter of a swirl flow formation part and the deaeration efficiency.

The deaeration efficiency changes also by other conditions. FIG. 7 is a graph resulting from evaluating, by CAE, the relationship between a ratio D/d of an inner diameter D of the swirl flow formation part 22 and the inner diameter d of the flow inlet 24 and the deaeration efficiency. As seen from FIG. 7, as the inner diameter D of the swirl flow formation part is increased, the deaeration efficiency decreases. This is because if the inner diameter D of the swirl flow formation part is increased, the flow velocity of the swirl flow flowing on the inner peripheral surface is reduced by increase in the sectional area of the formation part, and the centrifugal force applied to the oil decreases, so that the amount of air separated from the oil decreases. Further, if the inner diameter D is excessively reduced, the pressure loss increases.

According to the above discussion, the inventors of the present application have found that the deaeration efficiency is maximized if the inner diameter of the swirl flow formation part is D=1.5 d to 3 d.

Furthermore, the bubbles separated from the oil obeys the Boyle-Charles's law represented as PV=nRT at a constant temperature. At a low pressure, the diameters of bubbles are large. At a high pressure, the diameters of bubbles are small. The diameter of a bubble and the buoyancy has a proportional relation. The larger the diameters of bubbles are, the larger the effect of the centrifugal force is. Therefore, separation form the oil is easy. Accordingly, it is preferable to perform centrifugal separation between the oil and bubbles in a low-pressure environment.

As described above, according to the present embodiment, it is possible to efficiently remove the bubbles contained in the oil pressure-fed by the pump. By the removal of the bubbles, it is possible to improve the cooling efficiency of the motor, to which the oil is dropped or injected.

Further, when the motor cooling system is embedded, for example, in the transmission, it is possible to expect reduction in noise that is generated when bubbles are crushed, and improvement in hydraulic responsiveness.

The bubble separator according to the present embodiment can be formed significantly compactly, and therefore, can be easily embedded in an existing motor cooling system including a fluid circuit. The bubble separator performs gas-liquid separation using oil pressure-fed by a pump naturally provided in an existing motor cooling system, and therefore, does not require another element for operation. Accordingly, without need to largely change the design of the system, storage in a casing of a transmission can be achieved, for example.

The bubble separator according to the present embodiment can be easily made. For example, it is possible to make the bubble separator, simply by using a pipe with a large diameter as the swirl flow formation part, appropriately joining, to this, pipes with small diameters as the flow inlet, the flow outlet, the gas column promotion part and the gas discharge ports, and thereafter boring holes for the drop nozzles on the wall surface of the swirl flow formation part.

The embodiments of the present invention has been described above. However, the present invention is not limited to these embodiments, and various modifications and improvements can be made within the range of the gist of the present invention described in the claims.

In FIGS. 1 to 3, the swirl flow formation part 22 is illustrated as a cylindrical shape in which the inner diameter D is uniform. However, another shape may be adopted if it is possible to cause the oil pressure-fed from the pump 18 to swirl along the inner peripheral surface. For example, a funnel shape in which the inner diameter decreases as progress from one end toward another end may be adopted.

In the above description, use of the bubble separator in the motor cooling system including the fluid circuit incorporated in the transmission has been described. The bubble separator according to the present invention can be embedded in any apparatus or system that has need to separate bubbles contained in liquid. For example, application can be made also to separation of bubbles contained in engine oil. When the bubble separator is embedded in an apparatus, the swirl flow formation part does not need to be an independent component as long as this includes an internal space having a columnar shape. For example, it is allowable to use an internal space previously formed in a housing of an apparatus and having a columnar shape.

Liquid that is an object of gas-liquid separation is not limited to viscous fluid such as ATF and lubricating oil. For example, the liquid may be a refrigerant of a cooler or a cooling system. Similarly, gas to be separated is not limited to air.

The invention claimed is:

1. A bubble separator used in a fluid circuit for an automobile and that separates bubbles in liquid, comprising:
   a swirl flow formation part extending in a substantially horizontal direction, and including an internal space having a columnar shape;

a flow inlet disposed at one end of the swirl flow formation part, and being open so as to cause the liquid to flow in the flow inlet in a tangential direction of an inner peripheral surface of the swirl flow formation part and so as to form a swirl flow on the inner peripheral surface;

a flow outlet disposed at another end of the swirl flow formation part, and being open so as to cause the liquid to flow out of the flow outlet in a tangential direction from the inner peripheral surface;

a gas discharge port to discharge gas separated from the liquid in the swirl flow formation part outside of the swirl flow formation part; and at least one liquid drop nozzle provided on a wall surface of the swirl flow formation part.

2. The bubble separator according to claim 1, further comprising a gas column promotion part in an interior of the swirl flow formation part, the gas column promotion part extending coaxially with the swirl flow formation part and having a tubular shape.

3. The bubble separator according to claim 2, wherein a distance between a distal end of the gas column promotion part and a central axis of one of the at least one liquid drop nozzle closest to the distal end is equal to or more than one time an inner diameter of the flow inlet.

4. The bubble separator according to claim 1, wherein an inner diameter of the swirl flow formation part is 1.5 to 3 times an inner diameter of the flow inlet.

5. The bubble separator according to claim 1, wherein the gas discharge port is provided at each of both ends of the swirl flow formation part.

6. The bubble separator according to claim 1, wherein the liquid is a refrigerant of a cooler or a cooling system.

7. A viscous fluid circuit for an automobile, comprising:
an oil pan;
a pump that feeds oil from the oil pan;
a motor;
a bubble separator configured to separate gas bubbles from the oil fed from the pump, the bubble separator including:
an elongated swirl flow formation part defining a cylindrical internal space, the swirl flow formation part including a longitudinal wall having an inner peripheral surface that at least partially delimits the internal space;
a flow inlet including an inlet opening that opens into the internal space and through which oil fed from the pump is flowable into the bubble separator, the inlet opening structured and arranged such that oil flowing through the flow inlet flows into the internal space in an inlet flow direction that is tangential to the inner peripheral surface and contacts the inner peripheral surface to form a swirl flow on the inner peripheral surface;
a flow outlet including an outlet opening that opens into the internal space and through which bubble-separated oil is flowable out of the bubble separator and to the motor;
the flow inlet and the flow outlet disposed at opposite longitudinal ends of the swirl flow formation part;
at least one gas discharge portion including a gas opening via which gas separated from the oil is dischargable from the swirl flow formation part; and
at least one liquid drop nozzle disposed on the longitudinal wall through which bubble-separated oil is flowable to the motor.

8. The viscous fluid circuit for an automobile according to claim 7, wherein the oil is a lubricating oil or an automatic transmission fluid.

9. The viscous fluid circuit for an automobile according to claim 7, further comprising a gas column promotion part in an interior of the swirl flow formation part, the gas column promotion part extending coaxially with the swirl flow formation part and having a tubular shape.

10. The viscous fluid circuit for an automobile according to claim 8, wherein a distance between a distal end of the gas column promotion part and a central axis of one of the at least one liquid drop nozzle closest to the distal end is equal to or more than one time an inner diameter of the flow inlet.

11. The viscous fluid circuit for an automobile according to claim 7, wherein an inner diameter of the swirl flow formation part is 1.5 to 3 times an inner diameter of the flow inlet.

12. The viscous fluid circuit for an automobile according to claim 7, wherein the gas discharge port is provided at each of both ends of the swirl flow formation part.

13. The viscous fluid circuit for an automobile according to claim 7, wherein the liquid is a refrigerant of a cooler or a cooling system.

14. The bubble separator according to claim 1, wherein the flow inlet and the flow outlet each project outward from the wall surface of the swirl flow formation part transversely to the horizontal direction.

15. The bubble separator according to claim 1, wherein a central longitudinal axis of the flow inlet is disposed offset from a central longitudinal axis of the swirl flow formation part.

16. The bubble separator according to claim 1, wherein a central longitudinal axis of the flow outlet is disposed offset from a central longitudinal axis of the swirl flow formation part.

17. The bubble separator according to claim 1, wherein:
a central longitudinal axis of the flow inlet is disposed offset from a central longitudinal axis of the swirl flow formation part;
a central longitudinal axis of the flow outlet is disposed offset from the central longitudinal axis of the swirl flow formation part; and
the central longitudinal axis of the swirl flow formation part is disposed between the central longitudinal axis of the flow inlet and the central longitudinal axis of the flow outlet.

18. A bubble separator for separating gas bubbles from a liquid, comprising:
an elongated swirl flow formation part defining a cylindrical internal space, the swirl flow formation part including a longitudinal wall having an inner peripheral surface that at least partially delimits the internal space;
a flow inlet including an inlet opening that opens into the internal space and through which oil fed from a pump is flowable into the bubble separator, the flow inlet having a central longitudinal axis that is disposed offset from a central longitudinal axis of the swirl flow formation part such that oil flowing through the flow inlet flows into the internal space and contacts the inner peripheral surface to form a swirl flow on the inner peripheral surface;
a flow outlet including an outlet opening that opens into the internal space and through which bubble-separated oil is flowable out of the bubble separator and to a motor;
the flow inlet and the flow outlet disposed at opposite longitudinal ends of the swirl flow formation part;

at least one gas discharge portion including a gas opening via which gas separated from the oil is dischargable from the swirl flow formation part; and at least one liquid drop nozzle disposed on the longitudinal wall through which bubble-separated oil is flowable to the motor.

19. The bubble separator according to claim 18, wherein:

a central longitudinal axis of the flow outlet is disposed offset from the central longitudinal axis of the swirl flow formation part; and the central longitudinal axis of the swirl flow formation part is disposed between the central longitudinal axis of the flow inlet and the central longitudinal axis of the flow outlet.

20. The bubble separator according to claim 18, wherein the inlet opening is structured and arranged such that oil flowing through the flow inlet flows into the internal space in an inlet flow direction that is tangential to the inner peripheral surface.

\* \* \* \* \*